Patented May 22, 1951

2,554,141

UNITED STATES PATENT OFFICE 2,554,141

AZO ESTERS

Paul J. Flory, Kent, and Norman Rabjohn, Akron, Ohio, assignors to Wingfoot Corporation, Akron, Ohio, a corporation of Delaware No Drawing. Application January 16, 1946, Serial No. 641,650

7 Claims. (Cl. 260—144)

This invention relates to a new group of chemical compounds having valuable properties hereinafter described. More specifically, the invention relates to new esters having a plurality of azo radicals (—N=N—) and to methods of their preparation.

The purpose of this invention is to provide a new class of chemical compounds which are capable of curing rubber at room temperatures or upon heating to slightly elevated or moderate temperatures. A further purpose of this invention is to provide simple and inexpensive methods for preparing the new polyazo esters.

The new compounds have the general structural formula

in which R' may be a monovalent hydrocarbon radical, such as alkyl, aralkyl, aryl, and the corresponding alkyl-, halo-, and nitro-substituted radicals, a monovalent oxa-hydrocarbon radical such as alkoxyalkyl, aryloxyalkyl or alkoxyaryl radicals, the corresponding alkyl-, halo-, and nitro-substituted radicals, and in which R is a multivalent hydrocarbon radical, such as the alkylene, arylene, alkylarylene, and the corresponding alkyl-, halo-, and nitro-substituted radicals, and a multivalent oxa-hydrocarbon radical, such as the polyalkylene glycol radicals, the divalent arylene ether radicals, the mixed alkylene arylene ether radicals, the corresponding alkyl-, halo-, and nitro-substituted radicals, and the corresponding thiahydrocarbon radicals, and in which $x$ is a small whole number greater than one, but preferably between two and five inclusively.

The monovalent radical designated as R' in the above structural formula may be an alkyl radical, such as methyl, ethyl, hexyl, cetyl and melissyl radicals, an aryl radical, such as phenyl and naphthyl radicals, an aralkyl radical, such as benzyl, phenylethyl and naphthylmethyl radicals, a cycloalkyl radical, such as cyclohexyl and cyclopentyl radicals, an alkoxy-alkyl radical, such as 2-methoxyethyl, 2-ethoxyethyl, and the 2-isopropoxy-n-propyl, an alkoxyaryl radical, such as methoxy-phenyl and ethoxynaphthyl radicals, the thiahydrocarbon radicals such as (—C₂H₄—S—C₂H₅)

and

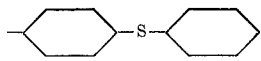

and the corresponding alkyl-, halo-, and nitro- substituted radicals such as 2-chloroethyl, 3-bromopropyl, fluoromethyl, nitrophenyl, parachlorophenyl, tolyl, xylyl, meta-ethylphenyl, 2-nitro-ethoxymethyl, and 2,4-dinitrobenzyl radicals.

The multivalent radical designated as R in the above structural formula may be an alkylene radical, such as ethylene, hexamethylene, decamethylene, and 1,2-propylene radicals, the oxa-alkylene radicals such as the radical (—C₂H₄—O—C₂H₄—)

derived from diethylene glycol, the radical (—C₂H₄—O—C₂H₄—OC₂H₄—)

derived from triethylene glycol, and the corresponding thiahydrocarbon radicals, an arylene radical, such as para-phenylene, meta phenylene, and the various naphthylene radicals, a divalent radical having both aryl and aliphatic characteristics, such as

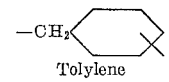
Tolylene

Toluylene

Xylylene

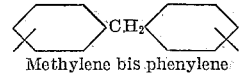
Methylene bis phenylene and

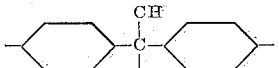
Propylene bis phenylene the alkyl-, halo-, and nitro-substituted derivatives of any of the above radicals, or a radical having a valence greater than two, such as glyceryl, pentaerythryl (the quadrivalent radical derived from pentaerythritol) and similar aliphatic or aromatic hydrocarbon radicals and alkyl-, halo-, or nitro-substituted hydrocarbon radicals. Any of the above radicals may contain oxa-, (ether oxygen atoms) or thia (thioether) atoms substituted for CH₂ groups.

The new polyazo esters are prepared by reacting a polychlorocarbonate of a polyhydroxy derivative having the desired multivalent radical of the type above described, such as phenylene, trimethylene, xylylene, and pentaerythryl, with an ester of hydrazine monocarboxylic acid wherein the carboxylate radical is linked to the desired monovalent radical of the types described above, such as methyl, benzyl, and cyclohexyl, and subsequently reacting the poly-hydrazo ester thereby formed with a suitable oxidizing agent for the purpose of converting it to the corresponding poly-azo derivative.

The poly-chlorocarbonates are prepared by reacting any polyhydroxy compound involving the desired polyvalent radical as above described, with phosgene, until all of the hydroxy radicals, or at least a plurality of the hydroxy radicals, are substituted with chlorocarbonate radicals

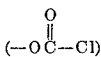

The poly-chlorocarbonates are preferably prepared by adding the polyhydroxy compound gradually to an excess of liquid phosgene while maintaining a temperature below 10° C. for the purpose of removing the heat of reaction, as well as to retain the phosgene in liquid state. It is desirable to surmount the reaction flask with a reflux condenser cooled below the boiling point of phosgene for the purpose of condensing the phosgene gas and returning the same to the reaction vessel. Some of the poly-chlorocarbonates may be purified by distillation at reduced pressure, although many can be satisfactorily purified by washing with water, or by heating to remove excess phosgene and hydrogen chloride.

The polyhydroxy compounds having aryl-ring-substituted hydroxy radicals may also be used in the preparation of poly-chlorocarbonates but the presence of a basic reagent is also then required. Suitable basic reagents are the tertiary amines, such as dimethyl aniline, triethylamine and pyridine, and the alkali or alkali earth metal hydroxides, carbonates, or oxides, such as sodium hydroxide, calcium carbonate and sodium carbonate.

The esters of hydrazine monocarboxylic acid may be prepared by reacting hydrazine hydrate with the carbonic acid ester having the monovalent organic radical desired in the final composition. Thus, diphenyl carbonate, diethyl carbonate, dibenzyl carbonate and any other carbonate ester may be reacted with an equal molecular proportion of hydrazine hydrate. The reaction takes place immediately, although generally it is desirable to stir the reaction mass and heat it slightly to complete the reaction.

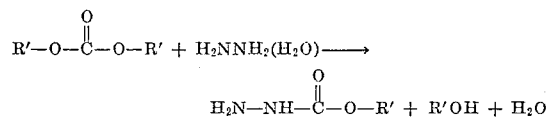

The resulting ester is usually a solid which can be separated from the reaction mass by adding water and can subsequently be recrystallized from alcohol solutions.

The condensation of the poly-chlorocarbonates with the esters of hydrazine monocarboxylic acid is conducted in a solution of a suitable solvent, such as dioxane, and in the presence of a basic reagent, such as triethylamine, pyridine, or other tertiary amine, or the oxides, carbonates, or hydroxides of an alkali or an alkali earth metal.

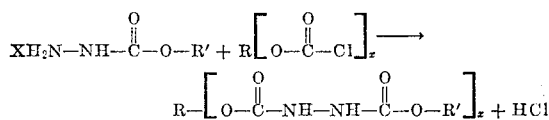

The resulting polyhydrazo ester may then be separated from the reaction mass and purified by recrystallization, for example from ethyl acetate solution.

The polyhydrazo esters may then be oxidized to the corresponding azo compounds by means of an oxidizing agent, such as concentrated nitric acid, or potassium permanganate.

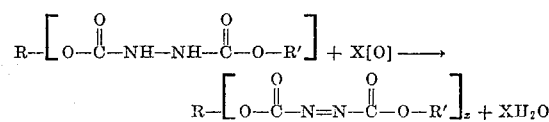

The oxidation reaction is exothermic but the application of heat may be necessary to start the oxidation. Once the reaction has begun it soon becomes very vigorous and should be controlled by pouring the reaction mass on ice or into cold water. The resulting polyazo compounds can be separated from the cooled reaction mass by extracting with benzene or ether and purified by washing with dilute sodium bicarbonate solutions, followed by drying in the presence of anhydrous sodium sulfate. The solvent may then be removed by evaporation, leaving the substantially pure polyazo compound.

The following are examples of compounds which may be prepared in accordance with this invention:

Decamethylene-bis(ethyl azodicarboxylate)

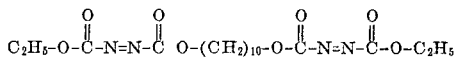

Diethyleneglycol-bis(phenyl azodicarboxylate)

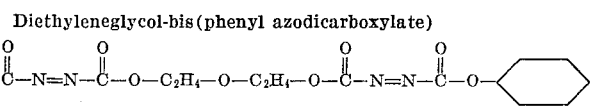

Glyceryl-tris(benzyl azodicarboxylate)

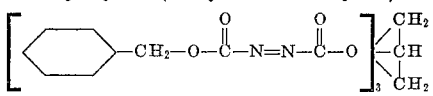

Para-phenylene-bis(cyclohexylazo dicarboxylate)

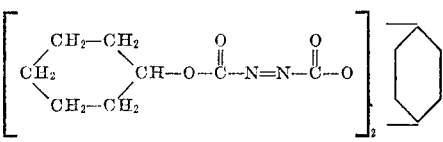

Thiodiethylene-bis(gamma-chloropropylazo dicarboxylate)

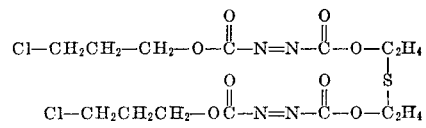

Para-xylylene bis(beta-methoxyethyl-azo dicarboxylate)

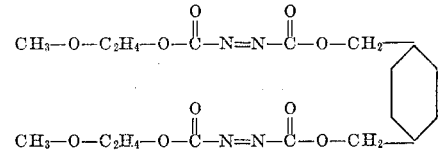

2,2-(p,p'-di(hydroxyphenyl) propane bis(p-nitro phenyl azo dicarboxylate) ester

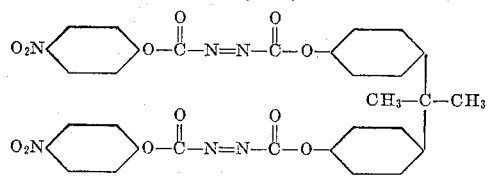

The new polyazo compounds described above are useful in vulcanizing rubber. Many of the compounds are active enough to induce the vulcanization of rubber without heating. The vulcanization is generally effected by mixing the azo compound with the rubber on a rubber mill, or mixing with a solution of rubber and applying the solution as an adhesive or coating composition. The formed rubber article or the rubber film obtained by the evaporation of the solvent from a rubber solution will become fully vulcanized by merely standing at room temperatures. In copending application Serial No. 641,652, now Patent No. 2,469,819 filed January 16, 1946, by Paul J. Flory and Norman Rabjohn, there is described and claimed methods of vulcanizing rubber by means of polyazo esters and new products thereby obtained.

The poly-hydrazo compounds which are intermediates in the synthesis of the polyazo compounds are described and claimed in copending application Serial No. 641,651, now Patent No. 2,533,189 filed January 16, 1946, by Paul J. Flory and Norman Rabjohn.

Further details of the preparation of the polyazo compounds are set forth in the following specific examples.

*Example 1*

One mole of benzyl alcohol (108 grams) was placed in a one liter three-necked flask equipped with a stirrer and a dropping funnel. The flask was cooled by immersion in an ice bath while a solution of 50 grams of phosgene in 250 cc. of toluene and 79 grams of pyridine were added gradually. After all of the reagents had been mixed thoroughly the reaction mass was warmed to 50° C. and allowed to cool. The pyridine hydrochloride, which precipitated during the reaction, was removed by filtration and the filtrate distilled under reduced pressure. Dibenzyl carbonate was obtained (B. P. 175–180° C. at 4 mm.).

A mixture of 35.5 grams of the dibenzyl carbonate and 10.5 grams of 85 percent hydrazine hydrate was stirred and warmed until a homogeneous solution resulted. It was allowed to stand overnight at room temperature and then poured into 100 cc. of water to form two liquid phases. The non-aqueous phase was separated and heated at 100° C. and 3 mm. pressure for four hours. The residue solified upon cooling and the hydrazine monocarboxylic acid benzyl ester was separated (M. P. 63–65° C.). A portion of the ester (10.4 grams) was dissolved in 75 cc. of dioxane and placed in a reaction flask. A solution of 4.76 grams of potassium hydroxide in 50 cc. of water and 10 grams of p-phenylene dichlorocarbonate in 150 cc. of dioxane were simultaneously added thereto. The reaction mixture was stirred without cooling and the heat of reaction caused an appreciable increase in temperature. After the reaction mass had cooled to room temperature it was poured into 600 cc. of water. A solid compound was obtained which was purified by crystallization from alcohol solution (M. P. 186–187° C.) and was identified as para-phenylene bis(benzyl hydrazodicarboxylate). The above bis hydrazo ester was dissolved in 10 volumes of concentrated nitric acid and warmed gently to start the oxidation. When the oxidation began to proceed vigorously the reaction mixture was poured onto 500 grams of ice. An orange oil separated which was extracted with three 100 cc. portions of diethyl ether. The combined extracts were shaken with an equal volume of 10 percent sodium bicarbonate solution and then with an equal volume of water and finally dried by contact with anhydrous sodium sulfate. After the ether was evaporated on a steam bath the resulting orange-colored oil was identified as the bis azo ester corresponding to the above-identified bis hydrazo ester.

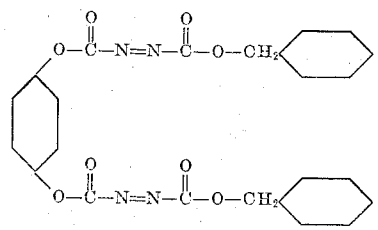

*Example 2*

Using the apparatus described in the preceding example, a solution of 20.8 grams of the ethyl ester of hydrazine monocarboxylic acid and 200 cc. of dioxane were placed in a reaction flask. A solution of 23.1 grams of diethylene glycol dichlorocarbonate in 25 cc. of dioxane, and a solution of 20.2 grams of triethylamine dissolved in 25 cc. of dioxane were added thereto simultaneously with vigorous and constant stirring. After the combination of reagents was complete the reaction mass was warmed for 45 minutes. After cooling to room temperature the solid triethylamine hydrochloride was removed by filtration; the dioxane was evaporated under reduced pressure and the diethylene bis ethyl hydrazo dicarboxylate so obtained was recrystallized from ethyl acetate (M. P. 130–132° C.).

Twenty grams of this ester was dissolved in 150 cc. of concentrated nitric acid with stirring. The reaction mixture was allowed to stand at room temperature until the oxidation reaction became quite vigorous. It was then poured onto 800 cc. of ice and water. The orange-colored oil which separated was extracted with benzene and the extract was washed with water and sodium bicarbonate solution. After drying in contact with anhydrous sodium sulfate the benzene was removed by heating at reduced pressures. The diethylene bis(ethyl-azo-dicarboxylate) was obtained as a bright orange-colored oil and had the molecular structure:

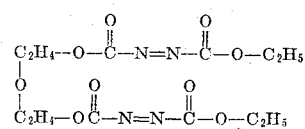

*Example 3*

Using a procedure analogous to those described in the preceding examples, a solution of 12 grams of hydrazine monocarboxylic acid methyl ester in 200 cc. of dioxane was placed in a reaction vessel and to it was added dropwise 20 grams of decamethylene dichlorocarbonate and 13.5 grams of triethylamine. After the reaction mass had cooled to room temperature the precipitate was removed and the filtrate concentrated on a steam bath at reduced temperatures. The residue was crystallized from ethyl acetate solution. The resulting hydrazo ester was a white crystalline solid having a M. P. of 112–114° C. Oxidation by the methods described in the preceding example produced a bis azo ester having the following structural formula:

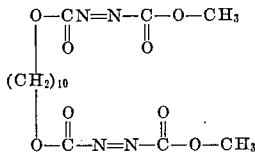

*Example 4*

To a solution of 50 grams (0.5 mole) of phosgene in 500 cc. of dry toluene were added dropwise solutions of 57 grams (0.25 mole) of 2,2-bis-(p,p'-di(hydroxyphenyl)) propane in 250 cc. of dioxane and 60.5 grams (0.5 mole) of dimethyl-aniline dissolved in 60 cc. of dioxane. The reaction mixture became warm and was subsequently heated on a steam bath for three hours. It was allowed to stand several hours and a precipitate of dimethyl-aniline hydrochloride formed. This precipitate was removed by filtration and the filtrate concentrated under reduced pressure. There was obtained 67 grams of an oil which gradually solidified; M. P. 88–90° C. It was the bis-chloroformate ester of 2,2-(p,p'-di(hydroxyphenyl)) propane.

To a solution of 20.8 grams (0.2 mole) of hydrazine monocarboxylic acid ethyl ester in 100 cc. of dioxane were added 35.3 grams (0.1 mole) of 2,2-(p,p'-di(hydroxyphenyl)) propane bis-chloroformate, dissolved in 185 cc. of dioxane and 20.2 grams (0.2 mole) of triethylamine, dissolved in 100 cc. of dioxane. After all had been added, the mixture was stirred for an hour, filtered to remove the precipitate of amine hydrochloride, and the filtrate concentrated. The residue was dissolved in a mixture of ethyl acetate and hexane and allowed to stand. A white solid gradually precipitated. There resulted 28.3 grams of material which melted at 169 to 171° C.

Fifteen grams of 2,2-(p,p'-di(hydroxyphenyl)) propane bis-ethylhydrazo dicarboxylate thereby formed was dissolved in 150 cc. of concentrated nitric acid. The solution was heated slowly to 55° C. when vigorous oxidation took place. The reaction mixture was poured onto 800 grams of ice and water and the orange colored oil extracted with benzene. The benzene extract was washed with water, sodium bicarbonate solution and dried over calcium chloride. The benzene was removed under reduced pressure and the bis-azo compound resulted as a dark orange colored oil.

A benzene solution of this material readily cured a solution of crepe rubber when evaporated at 60° C. This compound was identified as 2,2-(p,p'-di(hydroxyphenyl)) propane bis-(ethylazodicarboxylate) ester having the structural formula:

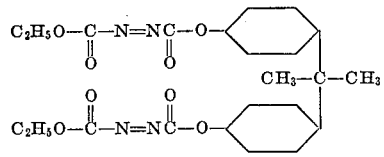

Other polyazo compounds may be prepared by reacting poly-chlorocarbonate esters with hydrazine and oxidizing the resulting hydrazo derivatives. Such compounds prepared from dichlorocarbonates would be linear polymers and have the molecular structure:

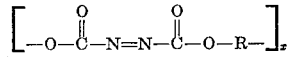

Other cross-linked polymers can be prepared from poly-chlorocarbonates having three or more chlorocarbonate groups. Such polymers may be defined structurally as follows:

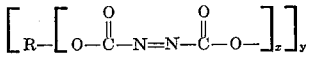

wherein $x$ represents the valence of R and is greater than one, and $y$ represents the number of R molecules in a polymer chain.

Although the invention has been described with respect to specific modifications, it is not intended that the invention shall be limited by the details thereof except to the extent incorporated in the following claims.

We claim:

1. As a new composition the compound having the structural formula

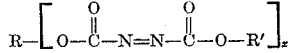

wherein R is a polyvalent radical of the group consisting of hydrocarbon, oxahydrocarbon and thiahydrocarbon radicals and the corresponding nitro and halogen substituted radicals, R' is a monovalent radical of the group consisting of hydrocarbon, oxahydrocarbon and thiahydrocarbon radicals and the corresponding nitro and halogen substituted radicals, the oxygen atoms being connected to carbon atoms in R and R', and $x$ is a small whole number between two and five inclusive.

2. As a new chemical compound the compound having the structural formula

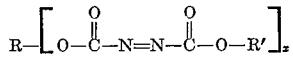

wherein R is a polyvalent hydrocarbon radical, R' is a monovalent hydrocarbon radical and $x$ is a small whole number between 2 and 5 inclusive.

3. As a new chemical compound diethylene glycol bis (ethyl azo dicarboxylate).

4. As a new chemical compound decamethylene bis (methyl azo dicarboxylate).

5. As a new chemical compound p-phenylene bis(benzyl azo dicarboxylate).

6. As a new chemical compound, an alkylene bis(alkyl azo dicarboxylate).

7. As a new chemical compound, a polyalkylene glycol bis (alkyl azo dicarboxylate).

PAUL. J. FLORY.
NORMAN RABJOHN.

REFERENCES CITED

The following references are of record in the file of this patent:

UNITED STATES PATENTS

| Number | Name | Date |
|---|---|---|
| 1,817,992 | Leopold | Aug. 11, 1931 |
| 2,378,571 | Moldenhauer et al. | June 19, 1945 |
| 2,401,549 | Chenicek | June 4, 1946 |

OTHER REFERENCES

Berichte, volume 44, (pages 3018–27) (1911).